United States Patent [19]

Kuehnle et al.

[11] 4,358,195

[45] Nov. 9, 1982

[54] ELECTROPHOTOGRAPHIC COLOR PROOFING APPARATUS

[75] Inventors: Manfred R. Kuehnle, New London, N.H.; Gordon Orme, Concord; Joseph L. Brophy, Marblehead, both of Miss.

[73] Assignee: Coulter Systems Corporation, Bedford, Mass.

[21] Appl. No.: 139,459

[22] Filed: Apr. 11, 1980

[51] Int. Cl.[3] .................... G03G 15/01; G03B 27/04; G03B 27/52

[52] U.S. Cl. .......................................... 355/4; 355/32; 355/77; 355/88; 118/645; 430/42

[58] Field of Search ...................... 430/7, 42; 118/645; 355/4, 12, 77, 32, 88, 110, 3 R

[56] References Cited

U.S. PATENT DOCUMENTS

| | | | |
|---|---|---|---|
| 3,644,035 | 2/1972 | Egnaczak et al. | 355/4 X |
| 3,809,476 | 5/1974 | Fader | 355/3 R X |
| 4,017,171 | 4/1977 | Wick et al. | 355/4 |
| 4,025,339 | 5/1977 | Kuehnle | 430/84 X |
| 4,247,191 | 1/1981 | Grace et al. | 118/645 X |
| 4,266,869 | 5/1981 | Kuehnle et al. | 355/77 X |

FOREIGN PATENT DOCUMENTS

| | | | |
|---|---|---|---|
| 52-26229 | 2/1977 | Japan | 355/4 |

*Primary Examiner*—J. V. Truhe
*Assistant Examiner*—Richard M. Moose
*Attorney, Agent, or Firm*—Silverman, Cass & Singer, Ltd.

[57] ABSTRACT

An electrophotographic color proofing apparatus is provided including a copyboard carrying a color separated positive and capable of being positioned into intimate contact with a charged photoconductive coating of an electrophotographic member. The engaged members are exposed to light, discharging the coating in increments to form a latent electrostatic image thereon. The copyboard is withdrawn and the exposed electrophotographic member rotated 180 degrees facing toward a toning assembly consisting of a row of plural toning units, each carrying a different color toner and arranged in line for linear translation below the exposed electrophotographic member with a selected one toning unit thereof being activated to apply a selected color toner to the latent electrostatic image. The toned member again is revolved 180 degrees. A pre-wet transfer medium in the form of print paper stock is engaged with the toned member for transfer of the toned image, preferably by drawing a roller across said member while employing a simultaneous electrical bias. A full color proof can be obtained by repeating the cycle, activating successive individual toning units of the assembly and using the same sheet of transfer medium. Registry of plural images applied to a single sheet is effected mechanically, as by upstanding pins provided on the support for electrophotographic member and/or the copyboard. Provision is made to clean both the photoconductive surface and the bias plates of the toning units of excess and/or residual toner.

53 Claims, 8 Drawing Figures

FIG. 1
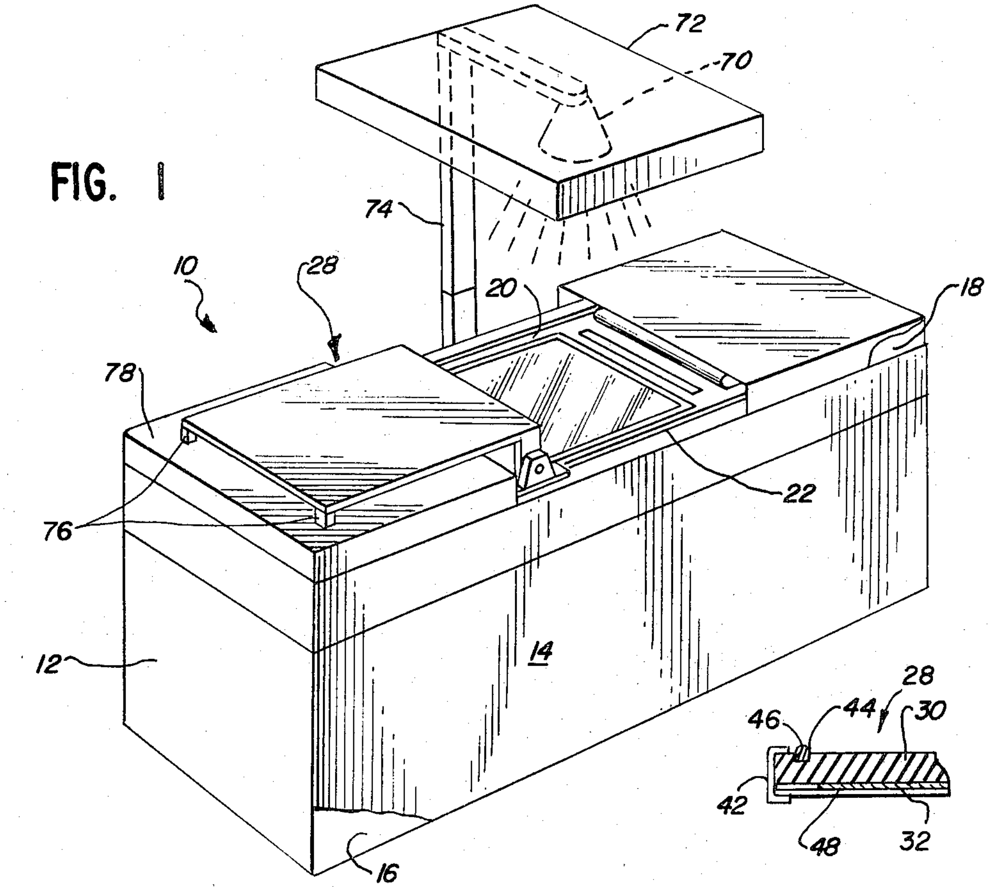
FIG. 7
FIG. 6
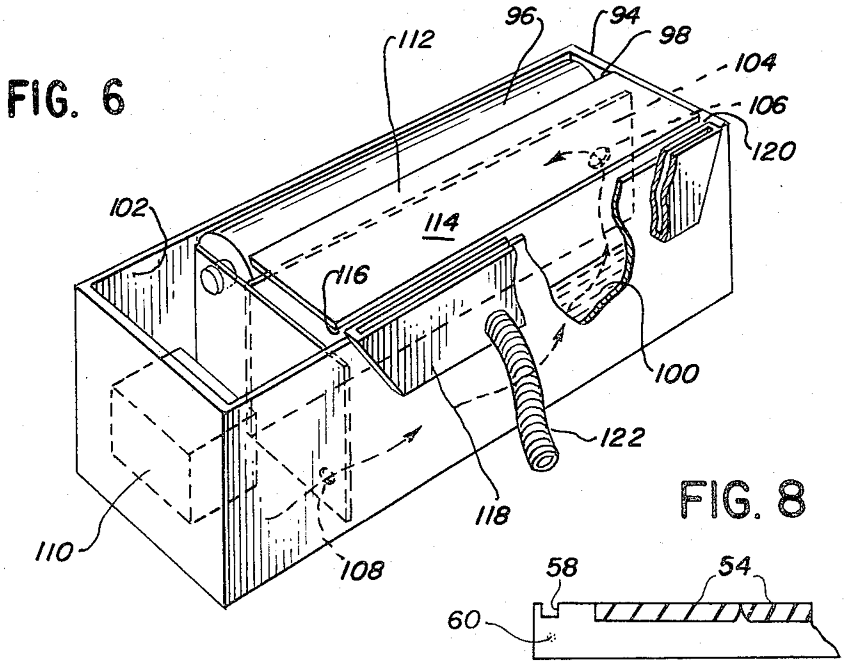
FIG. 8
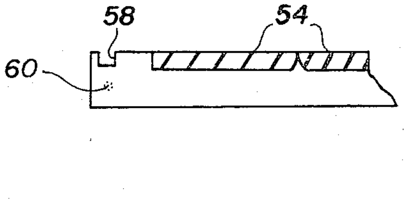

ELECTROPHOTOGRAPHIC COLOR PROOFING APPARATUS

BACKGROUND OF THE INVENTION

This invention relates generally to color printing and more particularly provides a method and apparatus to effect synthesis of color proofs from screened color separation positives employing electrophotographic methods.

Color proofs for the printing industry primarily have been made by silver halide photographic techniques using plural filter media for making color separated prints or color composite prints. The results obtained have been generally satisfactory but are capable of improvement. Electrostatic techniques have been suggested but generally involve single-use electrophotographic techniques and require complex, expensive equipment. In some instances, separate equipment may be required for different stages in the process and often are slow, expensive and provide low quality reproductions. Those processes known to the art for producing good results, often produce results of quality much higher than is desired or economically useful.

Generally speaking, the making of color copies by electrostatic techniques has in the past involved the steps of optically projecting color resolved images of the original onto a single charged electrophotographic member, one for each color resolved image, so as to form corresponding latent electrostatic images. These latent electrostatic images are developed to a desired (proper) color. The image is transferred to a secondary substrate, such as paper or the like. The color resolved images projected onto the electrophotographic member or members were obtained by projecting an image of the original onto the charged electrophotographic member or members through a plurality of color separation filters, one for each color to be reproduced, or by silver halide techniques.

Electrostatic systems which have been proposed for use in making color proofs, for the most part, have not included the capability for making changes in the color, size or hue of the final copy, if such changes are either desired or required except by very difficult or expensive means involving changes in the process.

In U.S. Pat. No. 4,025,339 which issued on May 24, 1977 to M. R. Kuehnle, there is described an electrophotographic film having qualities and properties which make it far superior to any other known electrophotographic film. The electrophotographic film disclosed in that patent features a photoconductive coating that is wholly inorganic, microcrystalline, electrically anisotropic in nature, which does not have reciprocity or intermittency effects, operates at low voltages, has very high sensitivity and can produce toned images of exceptionally high quality from either analog or digital information. The photoconductive coating may comprise a layer of RF sputtered cadmium sulfide having a thickness of the order of 3,000 to 10,000 Angstroms. Because of its exceptional properties, the electrophotographic film is particularly suited for use in making high resolution color copies of color originals by electrostatic techniques, and, in fact, has properties which enable it to be used for this purpose in a manner that hitherto has not been achievable with other types of electrophotographic members.

Because of the high speed of response of said coating (capable of being exposed in nanoseconds), the invention can be embodied in a relatively high-speed machine to provide color proofs much faster than heretofore possible.

Starting out with a color separated film original, one known process employs a master paper which carries thereupon an electrophotographic coating having photoconductive properties. The master paper is positioned on a platen employing register pins or the like, said platen being part of an electrostatic charging unit. An electrostatic charge is applied uniformly over the entire surface of the master paper. The separation film is placed in proper registry on the charged electrophotographic member and exposed to light, the non-imaged area discharged and the charge being retained in the imaged areas to define an electrostatic latent image. The master sheet is developed with toner of the proper color. After rinsing following development, the toned master sheet is removed from the charging and exposing apparatus and introduced into a separate multiroller transfer unit for transfer of the toned image to a substrate. The transfer normally is effected by first transferring the image to a cylindrical surface electrostatically and thereafter, from the cylindrical surface to the substrate. A separate drying unit is provided for evenly and thoroughly drying the proof sheet after completing each color cycle.

One problem encountered with the last described type of system is that the electrophotographic master can only be used once. Additionally, physically separated units were required for the performance of each stage of said proofing process.

SUMMARY OF THE INVENTION

Apparatus for forming color proofs electrophotographically comprising copyboard means for carrying a transparent color separated original, platen means for carrying an electrophotographic member, means for applying an electrostatic charge on said member, means for bringing the said original into intimate contact with the charged electrophotographic member, means for exposing the engaged original and electrophotographic member to a suitable amount of radiant energy, means for separating said imaged member from said copyboard without any static electricity discharge, means for developing the resulting electrostatic latent image with a selected one of plural subtractive primary toners, means for removing excess toner from the developed electrophotographic member, means for laying a transfer medium on said developed electrophotographic member and means for transferring the developed image to said transfer medium. Preferably, electrophotographic member is engaged with the emulsion side of the original facing the photoconductive coating of the electrophotographic member during exposure and, thereafter, rotated to face downward during development and removal of excess toner therefrom. On completion of the development, said member is returned to its imaging disposition with the developed image facing upwardly for transfer to a pre-wet print stock or the like medium.

The removal of excess toner from the developed electrophotographic member is conducted so as to retain a thin overlayer of toner carrier medium thereon to facilitate transfer. Transfer is conducted by first applying an electrical bias of one polarity while the transfer medium is applied to the developed image and then reversing the bias polarity to effect transfer.

The preferred apparatus includes a swingable copyboard for loading the original thereon, a window over which the copyboard and original is disposed, a platen seated at the window and mounting an electrophotographic member with the photoconductive coating thereof facing upward, the platen being mounted for selective rotation in 180 degree increments within said window, a carriage carrying a corona charging device arranged on said track means at one side of said window and a second carriage carrying a transfer roller also mounted on said track means at the opposite side of said window, a toning assembly, including plural toning units having each bias plate means, mounted below said first and second carriages and being movable linearly in a path below said platen while a selected one of said toning units is activated to apply a selected color toner to said electrophotographic member subsequent to exposure. The electrophotographic and copyboard are engaged intimately during exposure with the electrophotographic member rotated after separation of the copyboard therefrom, to face the toning assembly after charging and exposure. Vacuum means are provided as a part of the toning assembly for removing excess toner from the electrophotographic member immediately after development. Second vacuum means is provided for removing excess toner from the bias plate means before the next cycle. The electrophotographic member again is rotated to return the same to its position assumed for charging and exposure. Means are provided for holding the transfer medium in place engaged with the developed electrophotographic member during transfer, and for translating the transfer carriage over the engaged transfer medium and electrophotographic member to effect transfer of the developed image. Preferably, the transfer medium is pre-wet with an insulating liquid prior to transfer.

BRIEF DESCRIPTION OF THE DRAWING

FIG. 1 is a perspective view of a color proofing apparatus constructed in accordance with the invention;

FIG. 6 is a perspective view illustrating the one of plural toning assemblies employed with the apparatus of FIG. 1;

FIG. 7 is a fragmentary detail of the copyboard shown in the apparatus of FIGS. 1 and 2; and FIG. 8 is a fragmentary detail of the platen shown in the apparatus of FIG. 3.

DESCRIPTION OF A PREFERRED EMBODIMENT

Figure 2:
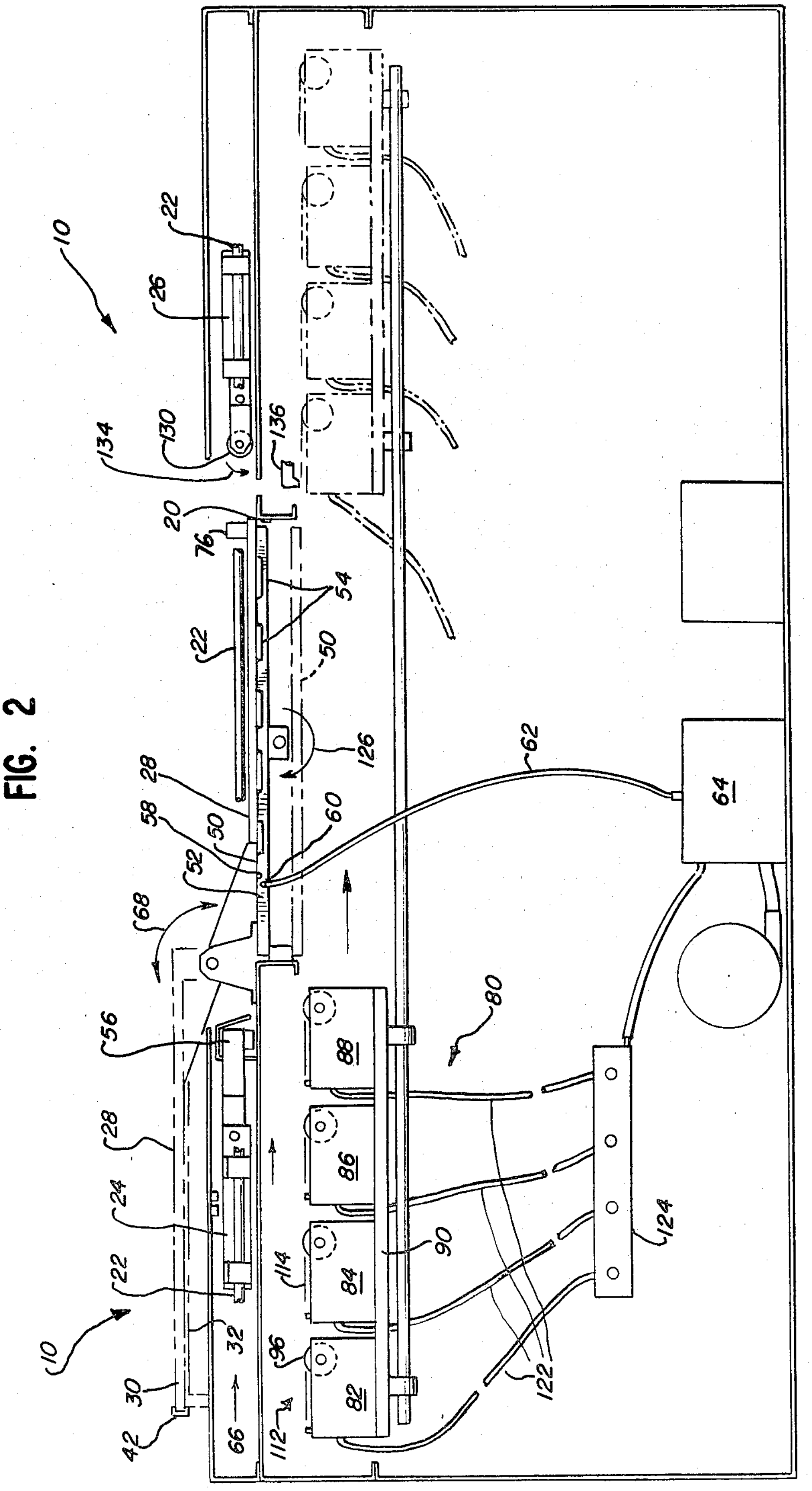
FIG. 2 is an enlarged side elevational view of the apparatus of FIG. 1, portions being deleted to show interior details.

Referring to the drawing, a color proofing apparatus embodying the invention is illustrated in FIGS. 1 and 2 and is designated generally by reference character 10. Apparatus 10 includes a generally rectangular chassis or framework 12 formed of plural horizontally and vertically oriented support members carrying side panels 14, a floor 16 and a top panel 18 which may or may not be formed of separate sections. A window 20 is formed in the top panel between opposed ends thereof. A track 22 is secured to the top panel 18 fastened along opposite longitudinal sides of said top panel 18.

A first or charging carriage 24 is mounted for linear movement along said track 22 and has a home location at one end of apparatus 10 located at one side of the window 20. Second or transfer carriage 26 also is mounted on the track 22 for linear movement and has a home location disposed on the side window 20 opposite the said one side. A copyboard 28 is formed of a pair of superposed plate members 30,32 hingedly connected one to the other along one edge for opening along the opposite edge. The plates 30,32 are each seated in a frame 34 which is fixedly mounted to arms 36 which are respectively journaled between upstanding mounting brackets 38 and 40 secured to the top panel 18 and adjacent the window 20 and alongside the first carriage. The pair of plate members 30, 32 are separated for insertion of a positive original and then are clamped together, say by clip 42. A sealing gasket 44 is accommodated in a suitable groove 46 formed in the frame about the peripheral edge thereof. The original 48 (color separated positive which is capable of passing light) is inserted emulsion side up when the copyboard 28 is disposed horizontally in loading condition above the first carriage 24. The loaded copyboard 24 then is moved to a position overlying the window 20 so that the emulsion side of the original faces inward of the window 20.

An electrophotographic member 50 carrying a photoconductive coating on a conductive substrate is placed onto the platen 52. Preferably, the substrate is formed of steel or like ferrous metal and the photoconductive coating is one on which a latent electrostatic image can be formed, retained for toning, transferred and then cleanly removed for subsequent reuse. An example of such a coating is the coating described in U.S. Pat. No. 4,025,339.

The platen 52 can be provided with a plurality of magnetic strips 54 mounted across the face and flush with the surface thereof. Where the electrophotographic member 50 has a ferrous metal substrate, it is held fixedly in place by said magnetic strips, when seated thereupon.

Charging, exposure, toning (or development) and transfer functions are performed by functional units which are selectively movable, except for the exposure unit.

The charging device 56 carried by the first carriage 24 may comprise one or a series of corona wires connected to a switchable voltage source (not shown) by a suitable flexible connection (not shown).

The platen 52 can be provided with a perimetrically disposed groove 58 leading to an outlet 60 which can be coupled by a vacuum line or hose 62 to a source of vacuum 64. When the copyboard and the platen are engaged, a seal is effected and vacuum is drawn to effect intimate engagement of copyboard 28 and the electrophotographic member 50.

Before the copyboard 28 is moved to engage the original and establish intimate engagement with the electrophotographic member 50, the first carriage 24 carrying a charging device 56 is moved along the track 22 in the direction of arrow 66 over the photoconductive coating for laying down a generally uniform charge potential thereon. The first carriage 24 then is returned to its home condition below the loading location of the copyboard 28. The loaded copyboard is swingably moved (see arrow 68) into intimate engagement with the charged electrophotographic member 50.

A light source 70 is mounted in reflector 72, in turn mounted to adjustable standard 74 and disposed over the window 20. Light from light source 70 is directed to the intimately engaged original and photoconductive coating whereby to form a latent electrostatic image of the original upon the photoconductive coating of the electrophotographic member. The vacuum drawn to effect intimate engagement of copyboard 28. The member 50 is released and the copyboard 28 raised swingably from its imaging disposition shown in FIG. 2 to its home position shown in FIG. 1 horizontally disposed over the first carriage 24, the separation occurring without static discharge. Copyboard 28 includes feet 76 to support same on cover plate 78.

After exposure, the platen 52 is rotated about 180 degrees to cause the photoconductive coating carrying the latent image to face downwardly toward toning assembly 80.

Figure 4:
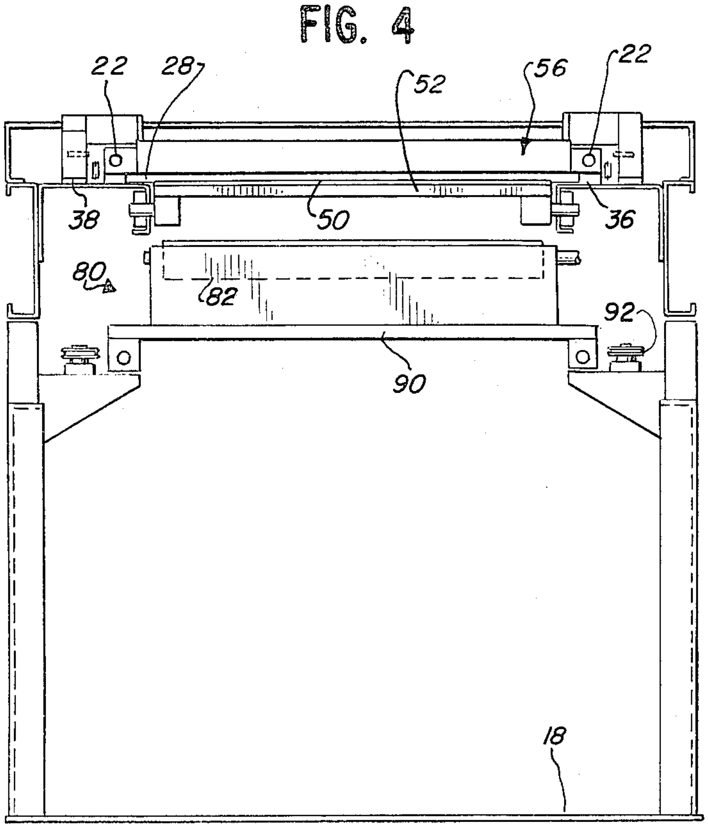
FIG. 4 is an end view of the apparatus of FIG. 2.

Toning assembly 80 includes four separate toning canisters 82,84,86,88 arranged side by side in a row upon a tray 90 which is mounted below the top panel 18. The toning assembly is driven by a belt 92 (see FIG. 4) between a home position below the second carriage 26 to a second position below the copyboard 28 and first carriage 24, as shown in solid line representation in FIG. 2.

Referring to FIG. 6, each toning canister 82,84,86,88 comprises a rectangular configured open topped box 94 which is divided into three intercommunicating compartments. A toner applicator roller 96 is mounted for driven rotation within compartment 98. A toner reservoir is defined by adjacent compartment 100 while a sump chamber 102 is defined by a third compartment. Interior wall 104 separates the toning compartment 98 and the reservoir. Suitable communicating passageways 108 is provided between the reservoir compartment 100 and the sump chamber 102. A small pump 110 is disposed within sump chamber 102 for effecting agitation of the liquid toner through the reservoir 100 and toning chamber 98 during toning. A bias plate 112 having a planar top surface 114 is seated upon the wall 104 extending over the reservoir and toning chamber, one edge of the plate 112 is spaced from applicator roller 96 and defines a small gap 116 between the plate 112 and the outside wall of the canister 82. Vacuum nozzle 118 is disposed adjacent the canister 82 along the length thereof and has an elongate mouth 120 extending adjacent to the bias plate 112. The vacuum nozzle 118 is coupled by flexible hose 122 to a source of vacuum indicated by reference character 64 by way of manifold 124. The vacuum nozzle 118 and its mouth 120 functions as a vacuum knife to remove excess toner from the photoconductive surface of member 50.

Each canister 82,84,86,88 of toning assembly 80 is adapted to contain one of four ink colors. Each canister 82,84,86,88 has a vacuum nozzle associated therewith. Each canister 82,84,86,88 has associated therewith its own bias plate, the top planar surface of which faces the photoconductive coating of the electrophotographic member when same is disposed in the toning condition.

After the exposure step, the platen 52 is revolved 180 degrees (arrow 126) bringing the photoconductive coating carrying the electrostatic latent image oriented to face downward toward the path of the toning assembly 80. The toning assembly 80 is translated across the window 20. During the translation of said toning assembly 80, a selected one of the toning units is energized causing a selected color toner to be applied to said facing photoconductive surface causing selected color toner particles to be deposited whereby to render said latent image visible.

The vacuum is drawn on the vacuum nozzle 118 of the activated toner unit to remove all but a thin layer of excess toner liquid from said photoconductive surface during the translation of the toner unit. After completion of said pass of the toning assembly across the window, the platen 52 is free to be rotated and thus, again is revolved 180 degrees so that the developed image faces upward, i.e. outward of the window 20 with the photoconductive surface generally at the level of the top panel 18 to be in condition for engagement by the transfer roller 130, carried by carriage 26.

Figure 5:
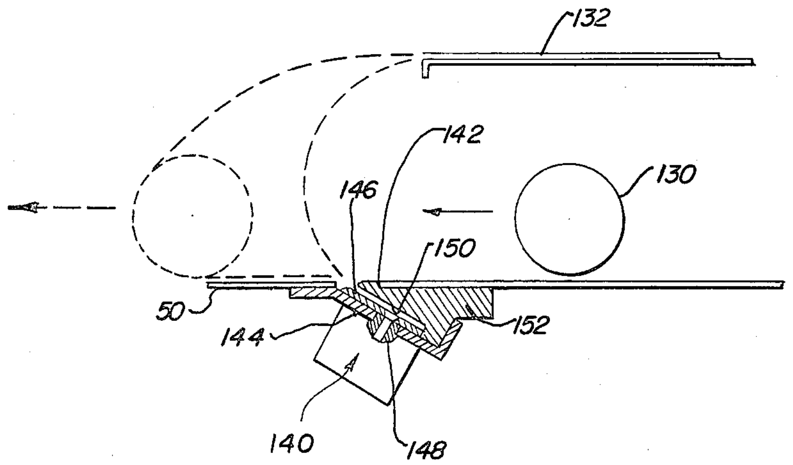
FIG. 5 is an enlarged detail of the print stock securing device employed in the apparatus of FIG. 2.

A transfer medium, normally print paper stock 132, which has been pre-wet with a hydrocarbon insulating liquid, is secured along the window 20 by clamping means (FIG. 5) arranged alongside the window adjacent the transfer carriage 26 and roller 130. The clamp 140 extends below slot 142 formed in top panel 18 at a location between window 20 and the transfer roller 130 (at home position). The clamp 140 includes a bed 144 and a plate 146 secured by a set screw 148. An inclined surface 150 is provided on body 152. The print paper 132 is inserted between surfaces of plate 146 and inclined surface 150 and screws 148 tightened, locking said print paper in place.

The transfer carriage 26 then is translated over the window 20 area. The transfer roller 130 located at the leading end of the carriage 26 and mounted for rotation in the direction shown by arrow 134, carrying the print stock 132 therewith, placing same in engagement with the photoconductive coating carrying the toned or developed image. During this first pass, a positive electrical bias voltage is applied by the transfer roller 130 as the print stock 132 is laid down or "peeled" thereby upon said coating, whereby to freeze the image and prevent spread. No pressure is applied by the transfer roller 130 during its translation over the print stock 132 except as results from its own weight (about 5 pounds). The transfer roller 130 is returned across the engaged print stock 132 and coating to its home location while a negative bias voltage is applied, effecting transfer of the developed image to the print stock 132. As the transfer carriage 26 returns to its home position, the print stock 132 carrying the transferred image is lifted or peeled from the electrophotographic member 50 while tranfer roller 130 is retracted and immediately after transfer is effected. The print stock 132 carrying the transferred color image can be rinsed and the image thereafter fixed thereupon. An overcoat of resin or the like can be applied to permanentize the image.

Figure 3:
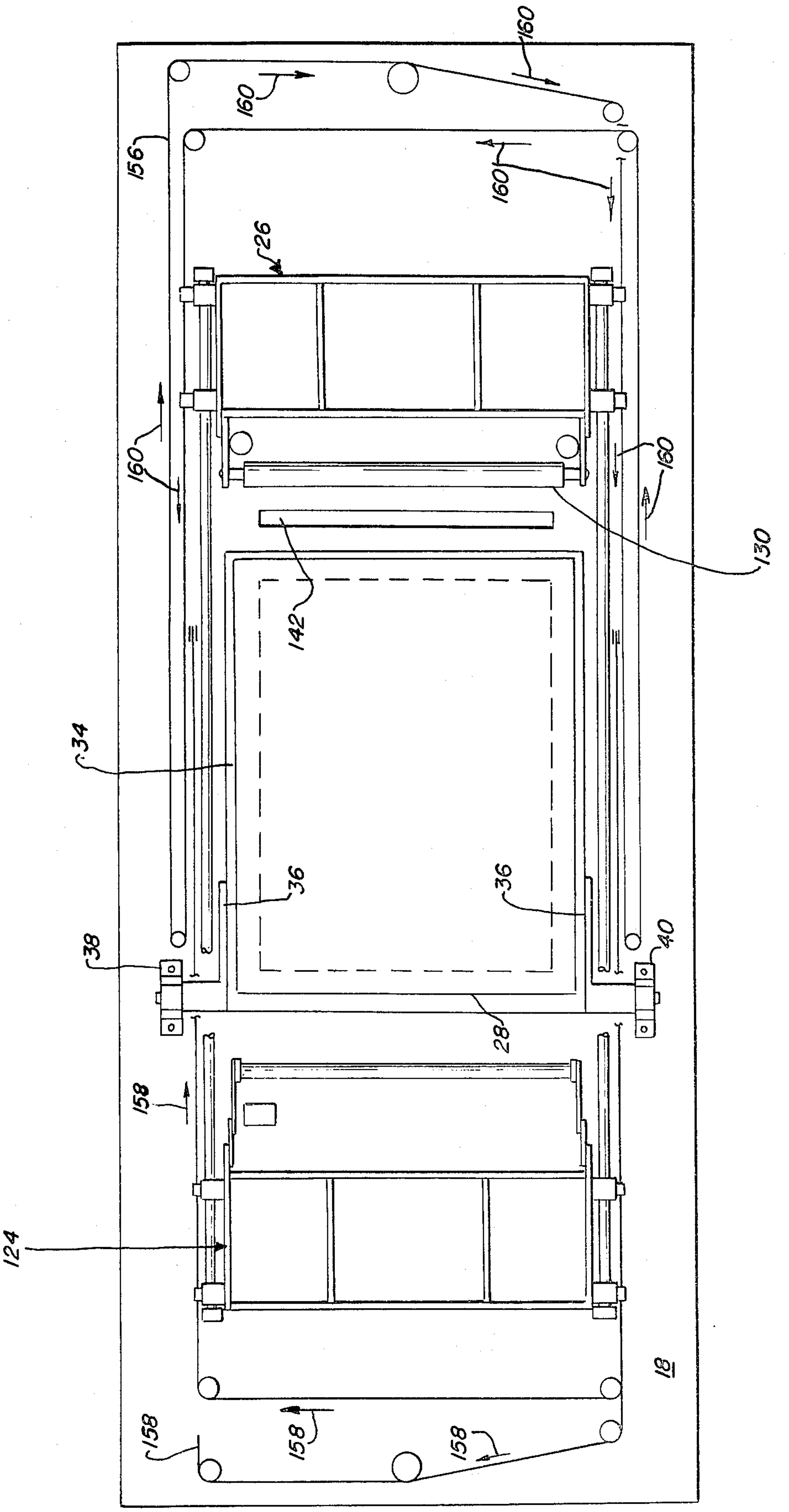
FIG. 3 is a top plan view of the apparatus of FIG. 2 portions also being removed to show interior detail.

The carriages 24, 26 are formed of suitable framing members for rigidity and are mounted on track 22 by suitable blocks and translatable by pulley drives illustrated in FIG. 3 along paths 158,160 respectively. Suitable cable type electrical connections (not shown) to corona power supplies and bias voltage sources (not shown) are understood, being generally conventional.

The copyboard 28 is opened, the color separation positive removed and another color separation positive introduced between the pair of transparent plates 30,32 to enable the next desired proof to be formed following the procedure just described. A new sheet of print stock can be employed or the previously imaged printing stock can be used. In such case, the next applied image is superposed in registry with the prior applied image or images by means of registration pins on the platen and/or copyboard.

During the return of the toning assembly 80 to its home location, a vacuum knife 136 mounted at said home location is operated to clear the bias plate of the activated unit of residual toner.

The electrical bias voltage during toning and during transfer may vary for each different color toner applied, so that a suitable rheostat or potentiometer is coupled in the operating circuit therefor to control the magnitude of the applied bias.

Ordinarily, four basic colors are applied; yellow, magenta, cyan and black, each toning canister carrying a different one of said toners. The following maximum densities are achieved for each of these colors, with the associated bias voltage.

| | | Transfer Bias | |
|---|---|---|---|
| | Toned density | 1st Pass (positive) | transfer (negative) |
| Yellow | 1.00-1.05 | 1000 V | 600 V |
| Magenta | 1.22-1.28 | 1000 V | 1000 V |
| Cyan | 1.30-1.35 | 750 V | 300 V |
| Black | 1.5-1.6 | 750 V | 400 V |

It should be understood that variations are capable of being made without departing from the spirit or scope of the invention as defined in the appended claims.

We claim:

1. Apparatus for forming color proof copies from a color separated positive transparency comprising:
   - means for carrying a color separated positive transparency,
   - platen means for mounting an electrophotographic member carrying a photoconductive coating on the surface thereof,
   - charging means for applying a charge potential on said photoconductive coating surface, said charging means comprising a corona charging device arranged adjacent said platen means for selective translation relative the photoconductive coating of said electrophotographic member,
   - means for placing said positive transparency and charged photoconductive surface in intimate engagement,
   - means for exposing said engaged transparency and photoconductive surface to a suitable amount of radiant energy from a source thereof to gorm a latent electrostatic image of the pattern carried by said transparency,
   - means for separating the exposed photoconductive coating and transparency without any static electricity discharge,
   - means for developing said resulting latent electrostatic image with a selected one of plural color subtractive primary color toners,
   - means for applying a transfer medium to said developed image and
   - means for transferring said developed image to said transfer medium.

2. The apparatus as claimed in claim 1 in which there is a chassis including at least a top panel defining a window between opposite ends, track means secured along the longitudinal edges of said top panel, a first carriage mounted on said track means at one end of the panel and carrying said charging means for selective translation over the window when said electrophotographic member is mounted on said platen means with the photoconductive coating surface thereof facing said charging means.

3. The apparatus as claimed in claim 1 wherein said means supporting said transparency comprises a copyboard formed of a pair of transparent plate members hinged along one edge for holding said transparency therebetween and means clamping said plate members at the opposite edge when said transparency is disposed between said plates, said copyboard being mounted for movement between a first position spaced from said platen means and a second position superposed over said platen means and arranged for intimate engagement with the photoconductive surface thereof.

4. The apparatus as claimed in claim 3 in which said pair of transparent plate members are mounted in a frame, arm members supporting said frame and arranged for swingable movement between said first and second positions.

5. The apparatus as claimed in claim 4 in which said arm members are pivotally mounted on said top panel.

6. The apparatus as claimed in claim 4 in which said means mounting said electrophotographic member comprises a platen mounted to orient said electrophotographic member with its photoconductive coating surface facing said outward of said chassis for charging, exposure and transfer and being translatable to position said photoconductive coating surface disposed in facing relation to said developing means for development.

7. The apparatus as claimed in claim 1 in which said transfer means comprise a transfer roller arranged adjacent said platen means to engage said transfer medium for selective translation thereacross after placement of said transfer medium across the photoconductive coating subsequent to development of the latent electrostatic image.

8. The apparatus as claimed in claim 1 in which said means for applying a transfer medium comprises a roller member arranged adjacent said platen and capable of selective first translation across the developed photoconductive coating surface in engagement with said transfer medium for laying same upon said surface during said translation and said means for transferring said developed image comprises the same roller member effecting a return translation across the engaged transfer medium and photoconductive coating surface.

9. The apparatus as claimed in claim 8 and means coupled to said transfer roller for applying a first electrical bias voltage of one polarity during said first translation and a second electrical bias voltage of polarity opposite the said one polarity during the return translation.

10. The apparatus as claimed in claim 8 and means for clamping said transfer medium along one edge thereof alongside said platen means and between said platen means and said transfer roller.

11. The apparatus as claimed in claim 9 and means for clamping said transfer medium along one edge thereof at a location between said platen means and said transfer roller and alongside said platen means.

12. The apparatus as claimed in claim 2 in which said means for charging comprise a corona charging device arranged for adjacent said platen means for selective relative translation across the photoconductive coating of said electrophotographic member.

13. The apparatus as claimed in claim 12 in which said transfer means comprise a transfer roller arranged adjacent said platen means to engage said transfer medium for selective translation thereacross after placement of said transfer medium across the photoconductive coating subsequent to development of the latent electrostatic image.

14. The apparatus as claimed in claim 12 in which said means for applying a transfer medium comprises a roller member arranged adjacent said platen and capable of selective first translation across the developed photoconductive coating surface in engagment with said transfer medium for laying same upon said surface during said translation and said means for transferring said developed image comprises the same roller member effecting a return translation across the engaged transfer medium and photoconductive coating surface.

15. The apparatus as claimed in claim 14 and means coupled to said transfer roller for applying a first electrical bias voltage of one polarity during said first translation and a second electrical bias voltage of polarity opposite the said one polarity during the return translation.

16. The apparatus as claimed in claim 14 and means for clamping said transfer medium along one edge thereof alongside said platen means and between said platen means and said transfer roller.

17. The apparatus as claimed in claim 15 and means for clamping said transfer medium along one edge thereof at a location between said platen means and said transfer roller and alongside said platen means.

18. The apparatus as claimed in claim 1 wherein said platen means is selectively movable to position the photoconductive coating surface of the electrophotographic member in superposed proximity to said copyboard subsequent to charging thereat and said means to effect intimate engagement comprise means for applying a negative pressure therebetween.

19. The apparatus as claimed in claim 18 in which said means for carrying the transparency is selectively movable over the platen means.

20. The apparatus as claimed in claim 19 in which said copyboard is pivotally mounted adjacent to said platen.

21. The apparatus as claimed in claim 19 in which said platen means is mounted for rotation to position said electrophotographic member with its photoconductive surface facing outward for charging exposure and transfer and facing toward said development means for development of the latent electrostatic image formed upon exposure.

22. The apparatus as claimed in claim 1 in which said platen means is disposed rotatably mounted between said charging means and said transfer means and selectively is translatable to position said photoconductive coating facing said charging means and transfer means for charging, exposure and transfer, and, said development means being located below said platen means, said platen being translatable to invert said electrophotographic member subsequent to exposure to position the exposed photoconductive coating proximate said development means in developing relation therewith.

23. The apparatus as claimed in claim 22 wherein said development means comprise separate development units, each carrying a different subtractive primary color toner and capable of applying same under an electrical bias voltage to said exposed photoconductive coating, said development means mounted for selective translation along a path below said platen means and means to selectively activate one of said separate development units to apply a particular subtractive primary color toner thereto.

24. The apparatus as claimed in claim 23 and means for removing excess toner from said photoconductive coating surface.

25. The apparatus as claimed in claim 23 in which each development unit includes a container for said toner, an applicator roller mounted within said container for applying the toner from the container to said exposed photoconductive coating surface, a plate member having a planar surface adjacent said applicator roller and adapted to establish a toning gap with said photoconductive coating and means to establish a development electrical bias voltage within said gap.

26. The apparatus as claimed in claim 25 and means to remove residual toner from said planar plate surface subsequent to development.

27. The apparatus as claimed in claim 25 and vacuum knife means associated with each development unit and located adjacent each planar plate member for removing excess toner from the photoconductive coating surface immediately subsequent application of toner thereto.

28. The apparatus as claimed in claim 2 in which said charging means comprises a corona charging device mounted on said first carriage and selectively relatively translatable across said photoconductive coating.

29. The apparatus as claimed in claim 28 in which said means for carrying said transparency comprise a copyboard, means mounting said copyboard for movement between a first horizontally oriented position offset from said window for loading, charging and transfer and a second horizontal position over said photoconductive coating subsequent to charging thereof and engaged in surface to surface contact therewith for exposure, being returnable to its offset position immediately thereafter.

30. The apparatus as claimed in claim 29 in which said platen means are mounted for rotation within said window for inversion of said electrophotographic member to enable development thereof, said development means being located for translation within said chassis for movement along a path past said inverted photoconductive member, said platen means being again inverted for transfer of the developed image to the transfer medium.

31. The apparatus as claimed in claim 1 and means for holding the electrophotographic member on said platen means.

32. The apparatus as claimed in claim 1 and means for drawing a vacuum from a source thereof between the engaged copyboard and platen means for establishing an intimate engagement therebetween during exposure of the charged electrophotographic member.

33. The apparatus as claimed in claim 31 wherein said electrophotographic member comprises a ferrous metal substrate and a photoconductive coating intimately bonded thereto, and said holding means comprise magnetic strip means mounted over said platen means flush with the surface thereof.

34. The apparatus as claimed in claim 1 in which said electrophotographic member comprises a ferrous metal substrate and a photoconductive coating intimately bonded thereto, and said platen means includes a planar platen having magnetic means disposed flush to the carrying surface thereof for holding said electrophotographic member fixed thereupon for rotation therewith.

35. The apparatus as claimed in claim 1 and first and second carriages, means defining a window between said carriages, means for translating said carriages linearly in opposite directions back and forth across said window, said charging and transfer means being mounted on said first and second carriages respectively, said platen means being mounted for rotation within said window with the carrying surface thereof in charging and transfer proximity to said charging and transfer means, said platen being arranged for rotational movement between a pair of horizontally oriented conditions, the first condition presenting the photoconductive coating of said electrophotographic member facing outward for charging exposure and transfer, said development means being mounted below said platen means for linear translation along a path across said window parallel to said platen means, the second condition presenting the photoconductive coating surface facing the path of movement of said development means and in development proximity thereto.

36. Apparatus for making color proof copies of a color separated positive transparency electrophotographically comprising A. a chassis of generally rectangular configuration and having at least a top surface, said top surface including a window spaced from the opposite ends of said chassis;

B. track means mounted on said top surface along opposite sides thereof and extending substantially along the length thereof between the opposite ends thereof;

C. a first carriage mounted on said track means at one end thereof for translation between a home position adjacent said window and a second position over said window;

D. a second carriage mounted on said track means at the opposite end thereof for translation between home position adjacent the window on the opposite side thereof relative said first carriage and a second position over said window;

E. copyboard means for carrying a color transparency thereon and mounted for movement between a load position overlying said first carriage at its home position and an imaging position overying said window, F. planar platen means mounted in said window for rotation therewithin through 180 degrees rotation between two horizontal conditions, G. an electrophotographic member having a photoconductive coating and secured on said platen means for movement therewith, H. charging means mounted on the leading end of said first carriage for applying a uniform electrostatic charge to the photoconductive coating of said electrophotographic member, when translated thereacross, I. light projection means including a light source mounted over said window, J. transfer roller means mounted for rotation at the leading end of the second carriage adjacent said window, K. means for establishing intimate engagement of said copyboard and the charged photoconductive coating of said electrophotographic member and forming thereat a latent electrostatic image thereon by exposure thereof to said light source during said engagement, L. a developing assembly arranged mounted within said chassis, said developing assembly including a plurality of separate developing units arranged side by side in a row, said assembly being selectively translatable along a linear path parallel to said platen means past said window below said electrophotographic member, each developing unit capable of applying developing toner material whose color corresponds to one color image component to the photoconductive coating surface during translation therepast, and means including a plate member having a planar surface horizontally arranged parallel to the path of movement of said developing device, for establishing an electrical bias between said planar surface and said photoconductive coating surface during development, M. the first horizontal condition of said platen disposing the photoconductive surface of said electrophotographic member facing outwardly toward said charging device, said copyboard and said transfer roller for charging, exposure and transfer but inverted facing toward said developing device during development, N. means for energizing only a selected one of said plural developing units during each translation of said development device past said plate means, and O. means for securing one edge of a transfer medium along said window and adjacent said transfer roller whereby translation of said transfer roller across said window causes said transfer medium to be engaged upon said photoconductive coating subsequent to development of said electrostatic latent image during a first pass thereover and to effect transfer of said developed image to said transfer medium during the return pass thereof across the window.

37. Apparatus for producing color proof copies from a color separated positive transparency electrophotographically comprising A. A chassis, B. a copyboard and a platen each mounted on said chassis, C. said copyboard carrying a color separated transparency and said platen having an electrophotographic member mounted thereon with the photoconductive coating thereof exposed, D. means for applying a charge potential on said photoconductive coating, said means comprising a corona charging device arranged adjacent said platen means for selective translation relative the photoconductive coating of said electrophotographic member, E. means for effecting an intimate engagement of said copyboard and the charged electrophotographic member, F. means for exposing said engaged copyboard and member to radiant energy from a source thereof to form a latent electrostatic image on said coating surface, G. means for separating the exposed photoconductive coating surface from said copyboard subsequent to formation of said latent electrostatic image thereon, H. a development station including individual development units capable of holding and applying developers of plural color subtracted primary colors I. means for placing said exposed photoconductive surface in developing proximity to said development station, J. means for applying a selected one of said color developers to said exposed photoconductive surface, and K. means for transferring developed image to a transfer medium.

38. The apparatus as claimed in claim 37 in which said copyboard is mounted on said chassis between a load condition and an imaging condition arranged over said platen.

39. The apparatus as claimed in claim 37 wherein said charging and transfer means are mounted to said chassis spaced apart at each end thereof.

40. The apparatus as claimed in claim 37 in which the platen is mounted to place the photoconductive coating surface exposed for charging exposure and transfer means and to invert same during development.

41. The apparatus as claimed in claim 37 in which said platen is mounted to said chassis in close proximity to said copyboard, said charging and said transfer means.

42. The apparatus as claimed in claim 37 in which said copyboard is mounted adjacent said platen and is capable of swingable movement into intimate engagement with the charged photoconductive surface for exposure and returnable subsequent to exposure.

43. The apparatus as claimed in claim 42 in which said platen is movable to present the photoconductive surface to said charging means, said exposing means, said development means and said transfer means serially, said platen being invertable subsequent to withdrawal of said copyboard after exposure whereby to place the exposed photoconductive coating surface in proximity to said development means, and being returnable to its position during transfer.

44. A method for making color proofs electrophotographically from color separated positive transparencies, comprising the steps of:

A. loading a color separated positive transparency on a copyboard,

B. applying a charge potential upon the photoconductive coating of a horizontally disposed electrophotographic member, C. establishing an intimate engagement of said copyboard and charged coating, D. exposing said engaged copyboard and charged coating to a light source to form a latent electrostatic image of the transparency, E. rotating said electrophotographic member 180 degrees from an initial position to invert said coating to place same in developing proximity to a developing device, F. applying a selected color developer to said latent image by translating a development device across said coating, G. rotating said electrophotographic member to return same to its initial position, H. laying a sheet of transfer medium across said photoconductive coating in engagement therewith and I. transferring the developed image from said coating to said transfer medium so as to form said color proof.

45. The method as claimed in claim 44 and the step of pre-wetting said transfer medium with an electrically insulating liquid prior to transfer of the developed image thereto.

46. The method as claimed in claim 44 and the step of applying a first electrical bias voltage to said transfer medium while same is being laid upon said photoconductive coating and applying a second electrical bias voltage of opposite polarity relative said first electrical bias voltage for transfer of said image to said transfer medium.

47. The method as claimed in claim 44 and the step of applying an electrical bias voltage between said development device and said photoconductive coating during development.

48. The method as claimed in claim 44 and the step of removing excess developer from said photoconductive coating immediately after development of said latent electrostatic image but leaving a residual layer of liquid toner carrier thereon.

49. The method as claimed in claim 44 and the step of removing residual developer from said developing device subsequent to development of said electrostatic latent image.

50. The method as claimed in claim 48 and the step of passing a vacuum knife across the photoconductive coating surface immediately following application of developer thereto.

51. The method as claimed in claim 44 and the step of drawing a negative pressure between the copyboard and the platen to establish said intimate engagement.

52. The method as claimed in claim 44 and the step of magnetically mounting the electrophotographic member on the platen.

53. The method as claimed in claim 44 and the step of fixing the transferred image permanently on the transfer medium.

* * * * *